United States Patent
Yagasaki et al.

[19]

[11] Patent Number: 6,110,065
[45] Date of Patent: Aug. 29, 2000

[54] METAL V-BELT

[75] Inventors: Toru Yagasaki; Takamichi Shimada, both of Utsunoimya, Japan

[73] Assignee: Honda Giken Kogyo Kabushiki Kaisha, Tokyo, Japan

[21] Appl. No.: 09/324,861

[22] Filed: Jun. 3, 1999

[30] Foreign Application Priority Data

Jun. 5, 1998 [JP] Japan .................................. 10-157523
Apr. 20, 1999 [JP] Japan .................................. 11-111939

[51] Int. Cl.$^7$ ................................ F16G 5/16; F16H 9/02
[52] U.S. Cl. .......................................................... 474/244
[58] Field of Search ................................... 474/244, 242, 474/201, 237

[56] References Cited

U.S. PATENT DOCUMENTS

| | | | |
|---|---|---|---|
| 4,525,159 | 6/1985 | Filderman | 474/244 X |
| 4,552,550 | 11/1985 | Howerton | 474/242 |
| 4,917,658 | 4/1990 | Sugimoto et al. | 474/242 |
| 5,123,880 | 6/1992 | Sekine et al. | 474/244 |
| 5,788,594 | 8/1998 | Lee | 474/244 |

FOREIGN PATENT DOCUMENTS

| | | |
|---|---|---|
| 0 377 918 | 7/1990 | European Pat. Off. . |
| 0 626 526 | 11/1994 | European Pat. Off. . |
| 62-131143 | 8/1987 | Japan . |
| 2-225840 | 9/1990 | Japan . |
| 7-12177 | 1/1995 | Japan . |
| 10115349 | 5/1998 | Japan . |

*Primary Examiner*—Rodney H. Bonck
*Assistant Examiner*—Saúl J. Rodríguez
*Attorney, Agent, or Firm*—Armstrong, Westerman, Hattori, McLeland & Naughton

[57] ABSTRACT

The relation of the length h1 of the V surface of each metal element to the saddle primary thickness h2 is determined such that the strength of the metal element for the Hertz's pressure generated on the V surface 2 from the normal force P which acts on the V surface 2 when the element engages in the V-shaped groove of a pulley and the strength for the bending moment which is produced by the normal force P on the saddles 1 of the metal element are made substantially equal to each other. Also, the relation of the length of the V surface to the saddle primary thickness is determined such that the fatigue life by the Hertz's pressure which acts on the V surface and the fatigue life by the bending moment which acts on the saddles are made substantially equal to each other. The length h1 of the V surface, which is determined in the above mentioned ways, can be about 0.26–1.0 of the saddle primary thickness h2. Thus, the miniaturization and lightening of the element is achieved by this rational method which equalizes the fatigue life for the whole body of the element while providing the element with necessary strengths.

5 Claims, 11 Drawing Sheets

DIRECTION OF ANOTHER PULLEY

METAL V-BELT

FIELD OF THE INVENTION

The present invention relates to a metal V-belt, which can be used for power transmission in a V-belt type continuously variable transmission, and more particularly to the structure of a metal element, a plurality of which are used for constituting such a metal V-belt.

BACKGROUND OF THE INVENTION

Such metal V-belts have been known, and some are disclosed in, for example, Japanese Laid-Open Utility-Model Publication No. S62(1987)-131143 and Japanese Laid-Open Patent Publications Nos. H2(1990)-225840 and H7(1995)-12177. As an example, a portion of one type of metal V-belt 13 is shown in FIGS. 5 and 6. This metal V-belt comprises metal rings 14, each of which is an endless belt, and a plurality of metal elements E, each of which is supported in succession along the metal rings 14. This metal V-belt is put around a drive pulley 11 and a driven pulley 12 and disposed therebetween, each pulley having a V-shaped groove, the width of which is variably adjustable. With this construction, when the widths of the V grooves of the pulleys are variably adjusted, the V-belt pitch radii of the pulleys are variably changed so that the speed ratio is continuously varied.

In designing a metal V-belt which can be used for a continuously variable transmission, it is important to improve the transmission efficiency of the metal V-belt. For this reason, the metal rings and the metal elements should be built with sufficient strengths while their sizes and weights are reduced as much as possible since metal V-belts are typically exposed to a rotational speed of up to 5,000 rpm or to 6,000 rpm. A method for reducing the weight of the metal element E is described in the above mentioned Japanese Laid-Open Utility-Model Publication No. S62(1987)-131143. In this method, the central bottom part (the bottom of the body portion 3 shown in FIG. 6) of the metal element E is cut off to reduce the weight of the metal element while the height (equivalent to the saddle primary thickness h2 in the following embodiment according to the present invention) of the remaining body of the metal element is regulated to attain a uniform pressure distribution over the V surface of the metal element, which surfaces of the metal elements are engaged with the V-shaped grooves of the pulleys.

Also, a method for improving the transmission efficiency of the metal V-belt is disclosed, for example, in the above mentioned Japanese Laid-Open Patent Publication No. H2(1990)-225840. The publication discloses a motion that removes the clearance among the metal elements in the slack side of the metal V-belt. In this method, each metal element is designed such that the center of gravity of the element is located near the inclined region on the main surface of the metal element or radially outside of the inclined region. With this construction, the metal element retains an impulsive force when it comes out of the driven pulley, and by this impulsive force, the metal elements in the return side of the metal V-belt are forced to connect with one another without clearance. As these metal elements in a successive connection without any clearance enter the V-shaped groove of the driven pulley, this metal V-belt drive has an improved efficiency of power transmission and a reduced friction.

Also, a method for improving the transmission efficiency and the abrasion resistance of the metal V-belt is disclosed, for example, in the above mentioned Japanese Laid-Open Patent Publication No. H7(1995)-12177. This method determines two contact points: a first contact point where the supporting surfaces (equivalent to the upper surfaces of the saddles 1 in FIG. 6) of the metal element are in contact with the innermost portions of the metal rings respectively, and a second contact point where the surfaces of a top portion (equivalent to the lower surfaces of the ears 6 in FIG. 6) of the metal element are in contact with the outermost portions of the metal rings respectively. Then, the metal V-belt is constructed to set the relation of the horizontal distance A between these two contact points with the clearance B in the direction of the thickness of the metal rings in the slots of the metal element as $\tan^{-1} B/A$ is smaller than 1. With this construction, the magnitude of turning around and of translation (i.e., sliding) of the metal element at the entrance of a pulley is restricted to improve the transmission efficiency and the abrasion resistance.

However, the technique for reducing the weight of the metal element, which is described in the above mentioned Japanese Laid-Open Utility-Model Publication No. S62(1987)-131143 is to determine the contact length of the V surface of the metal element (hereinafter referred to as "element") which meets the V-shaped grooves of the pulleys and the height of the plate remaining after the central bottom part of the element has been cut off to make the distribution of the compressive stress over the V surface of the element uniform. However, this method determines the length of the V surface and the height of the plate not in consideration of the bending moment which results from the penetration of the element into the V-shaped groove of the pulley and which acts on the central portion of the element (i.e., the body 3 in FIG. 6).

However, when the plate thickness of the central portion of the element is determined to make the distribution of the compressive stress uniform over the V surface, even though this is effective in reducing the weight of the element, the element may be cut off excessively. As a result, the remaining portion of the element may be exposed to an increased bending stress, which may jeopardize the element to a fatigue failure. On the other hand, if the length of the V surface of the element is determined to make the distribution of the compressive stress uniform while the bending stress is kept sufficiently small, then the length of the V surface may become excessively great. As a result, the weight of the element may not be reduced sufficiently.

In the technique for improving the transmission efficiency which is disclosed in the above Japanese Laid-Open Patent Publication No. H2(1990)-225840, the center of gravity of the element is considered, but the inertia (or centrifugal force) around the center of gravity of the element and the weight of the element are not considered. Therefore, even though the center of gravity of each element is positioned radially outside of a respective pulley by enlarging the ears of the element, if the weight of the element increases, then the movement of the elements becomes unstable at the element-exit side of the driven pulley and at the element-entry side of the drive pulley, which locations are in the slack side of the metal V-belt. As a result, excessive loads against the metal rings (hereinafter referred to as "rings") and the elements are generated. In this condition, the transmission efficiency decreases over a range of high rotational speed (e.g., 5000–6000 rpm) because of the inertia of the element, and also, the life of the rings is shortened.

It is desirable that the above mentioned well-known method which is to improve the abrasion resistance and the transmission efficiency of the metal V-belt be revised to reduce the inertia of the element around the center of gravity of the element and to reduce the weight of the element for further improving the abrasion resistance and the transmission efficiency.

SUMMARY OF THE INVENTION

The present invention is to satisfy the above mentioned technological need. It determines certain dimensions of an element which constitutes a metal V-belt for mechanical power transmission for the purpose of reducing the weight of the element and thus reducing the inertia of the element substantially such that the strength for the Hertz's pressure which acts on the V surface (e.g., the V surface 2 in the following embodiment) of the metal element being in contact with the V-shaped groove of a pulley and the strength for the bending moment which is produced by a normal force from the V-shaped groove of the pulley and which acts on the body (e.g., the body 3 in the following embodiment) of the metal element are set substantially equal to each other.

Here, it is important to consider the stress produced in the body of the element, and it is necessary to determine the region in the body of the element where the bending stress becomes maximum. Typically, this maximum bending stress is produced in the portion where the height of the body in the radial direction of the pulley is minimum (e.g., the height h2 in the following embodiment, and it is referred to as "saddle primary thickness"), which height is defined between the bottom surface of the body (the inner surface in the radial direction of the pulley) and the upper surfaces of the saddles which are in contact with the innermost surfaces of the rings (e.g., the rings 14 in the following embodiment).

Therefore, when the length h1 of the V surface, at which the element is in contact with the V-shaped groove of the pulley, and the saddle primary thickness h2 are determined, the strength of the element for the Hertz's stress produced at the V surface and the strength for the bending stress produced at the portions of saddle primary thickness, where the bending stress produced in the body of the metal element is maximum, are set substantially equal to each other. Also, the length h1 of the V surface and the saddle primary thickness h2 are determined such that the Hertz's stress and the bending stress are made substantially equal to each other. Also, the length h1 of the V surface and the saddle primary thickness h2 are determined such that the fatigue lives resulting from these stresses are made substantially equal to each other. By using any of the above determination methods, the length of the V surface of the element can be reduced rationally to achieve further miniaturization of the element.

According to the present invention, the length h1 of the V surface is defined more specifically as 0.26–1.0 of the saddle primary thickness h2. This saddle primary thickness h2 is calculated from an equation, which will be described in the following section of this document. However, some values listed in the above mentioned prior art methods can be also applied as the saddle primary thickness h2. The range of ratio according to the present invention, i.e., h1=(0.26–1.0) h2, is much smaller than the conventional ratio, which is typically h1≧1.2h2. For example, the above mentioned Japanese Laid-Open Utility-Model Publication No. S62 (1987)-131143 discloses the ratio of h1=(1.25–2.0)h2. Thus, the length of V surface determined by using the method according the present invention is much smaller than the conventional length.

To reduce the length of the V surface, for example, the radius of curvature of the portion where the saddle surface and the V surface meet each other can be made relatively large, or the radius of curvature of the lower portion of the V surface can be made relatively large. However, it is preferable to enlarge the radius of curvature of the lower portion of the V surface which extends from the saddle surface radially inward to the pulley, or to cut off the lower portion so as to reduce the length of the V surface. By such a method, preferably, the element should be configured such that the center of gravity of the element is positioned radially outside of the line (e.g., the rocking edge 20 in the following embodiment) that is formed by the intersection of the surface of the element and the inclined face of the element which face is provided for the flection of the metal V-belt around the pulley.

In this way, if the lower portion of the element is cut off, then the weight of the element is reduced by the amount which is cut off, and the inertia of the element is also reduced accordingly. In addition, the center of gravity of the element is positioned radially outside of the pulley, and this configuration promotes the motion which reduces the clearance among the elements in the metal V-belt at the element-exit side of the pulley. By determining the optimal value for the length of the V surface in relation to the saddle primary thickness in this way, not only the weight of the element is rationally reduced to decrease the inertia, but also, because of the location of the center of gravity, which is in the upper portion of the element, the element aligning effect is further promoted at the exit of the driven pulley.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
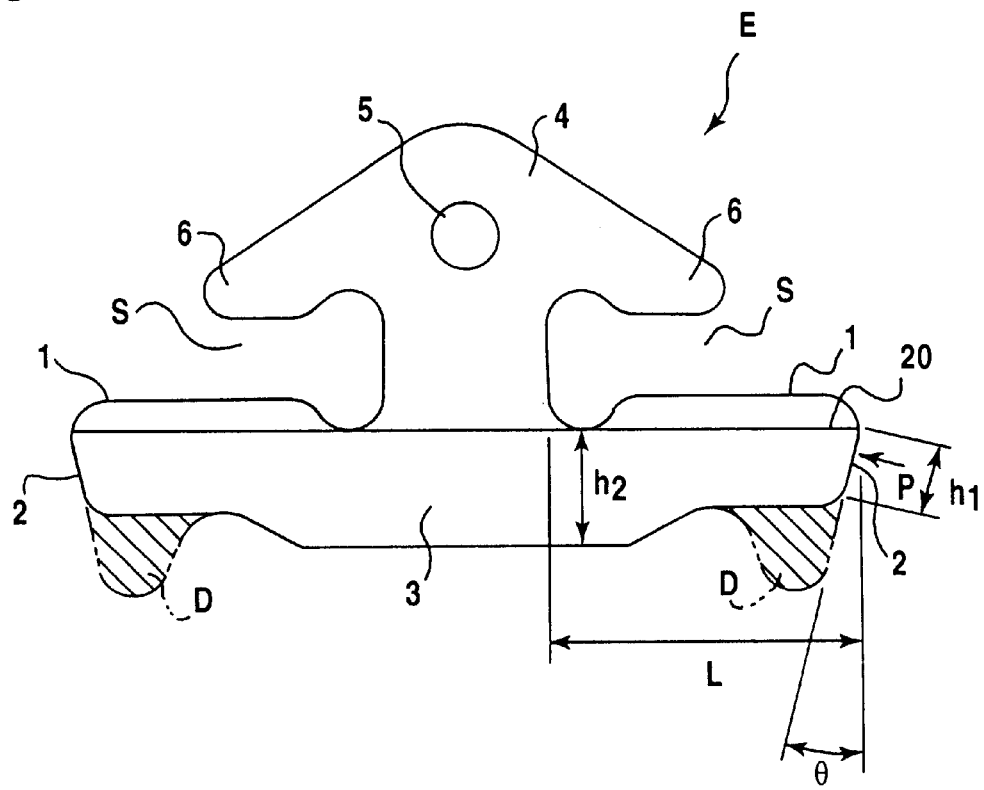
FIG. 1 is a front view of an element of a metal V-belt according to the present invention.
Figure 6:
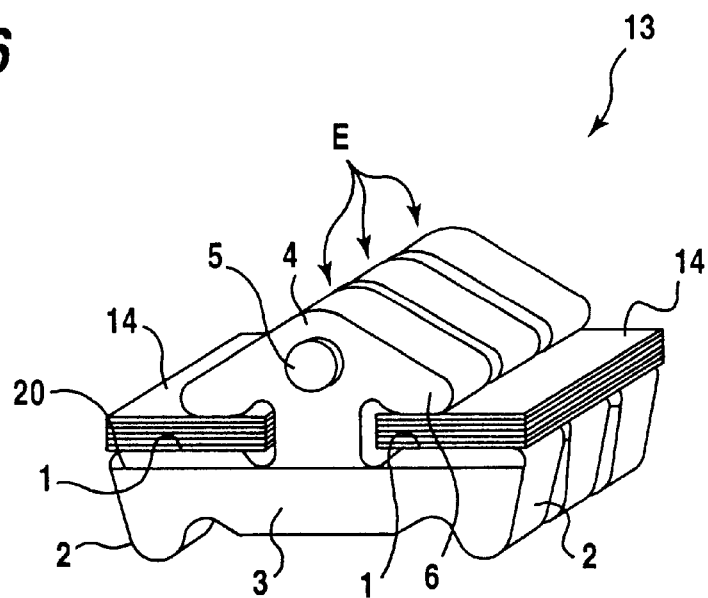
FIG. 6 is a schematic diagram showing a construction of the metal V-belt.
Figure 2:
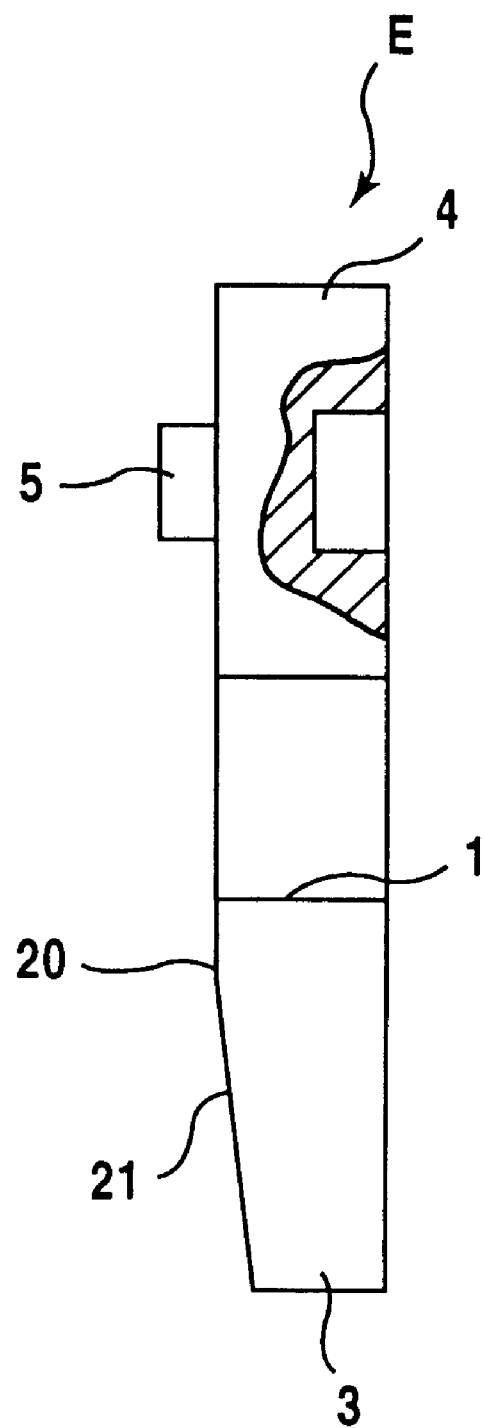
FIG. 2 is a side view of the element.
Figure 5:
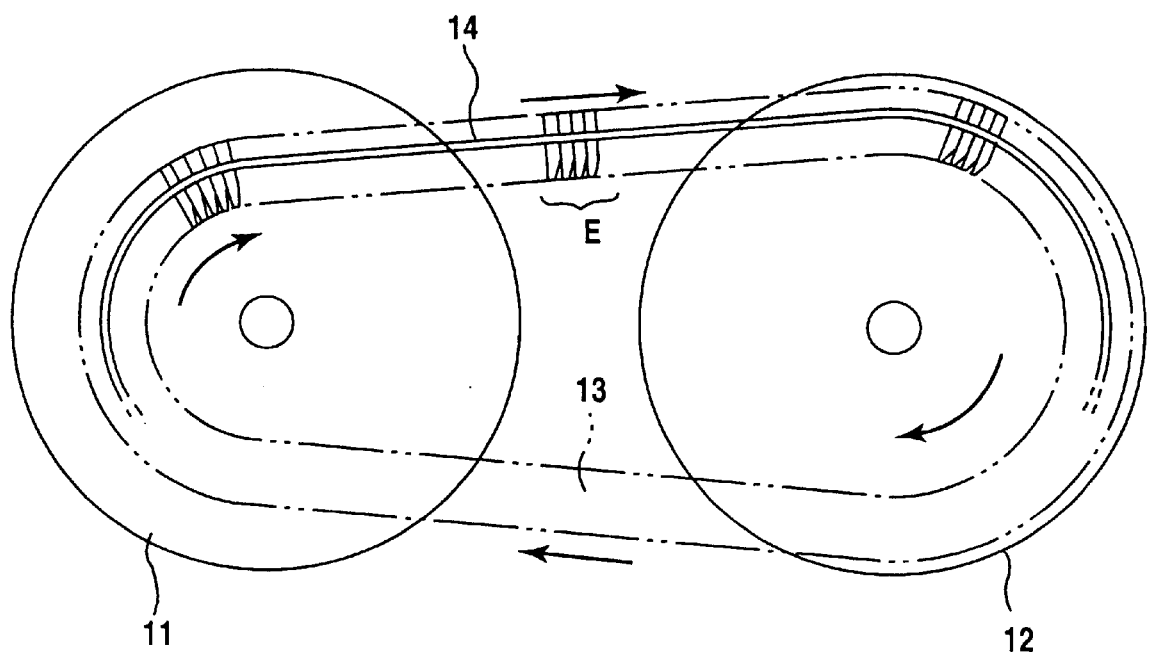
FIG. 5 is a schematic diagram of a continuously variable transmission, in which the metal V-belt is disposed.

FIGS. 5 and 6 show the construction of a metal V-belt. The present invention relates particularly to an element which is used for constituting this metal V-belt. This element is shown in detail in FIG. 1 and FIG. 2. The construction of the metal V-belt shown in FIG. 5 and FIG. 6 is identical with that of a conventional metal V-belt except the construction of the element. Thus, the metal V-belt comprises metal rings 14, each of which is an endless belt, and a plurality of metal elements E, each of which is supported in succession along the metal rings 14. This metal V-belt is put around a drive pulley 11 and a driven pulley 12 and disposed therebetween. In this construction, when the widths of the V grooves of the pulleys are variably adjusted, the V-belt pitch radii on the pulleys are variably changed so that the speed ratio is continuously varied.

The element E includes lateral slots S, which are to receive the metal rings 14. In this configuration of the element, the part of the element above the slot S (i.e., radially outside of the pulley) is referred to as "head 4" whereas the part below (i.e., radially inside of the pulley) is referred to as "body 3". The head 4 includes a protrusion 5 (referred to as "coupling"), which engages with an adjacent element in the metal V-belt, and, on the side opposite to this protrusion, a dent (not shown), which is to receive the protrusion of another adjacent element. These protrusions and dents are engaged one by one to align a plurality of elements in the metal V-belt. Each element includes an inclined face 21 to make the metal V-belt freely flexible around the pulleys. Hereinafter, the line 20 formed by the inclined face 21 intersecting the surface of the element is referred to as "rocking edge 20". In addition, the portions of the head which extend laterally from the coupling 5 toward the rings are referred to as "ears 6".

The body 3 of the element comprises saddle surfaces 1, each of which comes into contact with the innermost surface of a corresponding ring to receive the tension of the rings, and V surface 2, each portion of which has a height h1 and comes into contact with the V-shaped grooves of the pulleys for torque transmission. Furthermore, the portions of the body 3 and ears 6 which are located at the deepest parts of the slots S are rounded to avoid stress concentration. Due to the existence of these rounded portions, the height of the body is typically smallest in the root portions of the saddles 1, and therefore, the bending stress which results from the normal forces from the V-shaped groove of the pulley, the tensile forces of the rings, etc. is maximum in these regions. This smallest height is referred to as "saddle primary thickness h2".

Now, the method for lightening the element according to the present invention is described with some equations. First, the stress which is produced in the portions having the saddle primary thickness h2 is considered. These portions are exposed to a bending stress $\sigma 2$ which is caused from a bending moment generated by the friction between the V surface of the element and the V-shaped groove of the pulley. This bending stress $\sigma 2$ can be expressed in the following equation, wherein M is the bending moment acting on this specific portion; Z2 is the modulus of section of this portion; $\mu$ is the friction coefficient of the V surface; L is the length of the overhang of the body; P is the mean effective load acting on the V surface; $\alpha$ is a load concentration factor; and t is the equivalent plate thickness of the body.

$$\sigma 2 = M/Z2 = 6\mu L P\alpha/th2^2 \tag{1}$$

By solving this for h2, the following will result.

$$h2 = \sqrt{[(6\mu L P\alpha)/(t\sigma b\,2)]} \tag{2}$$

Figure 3A:
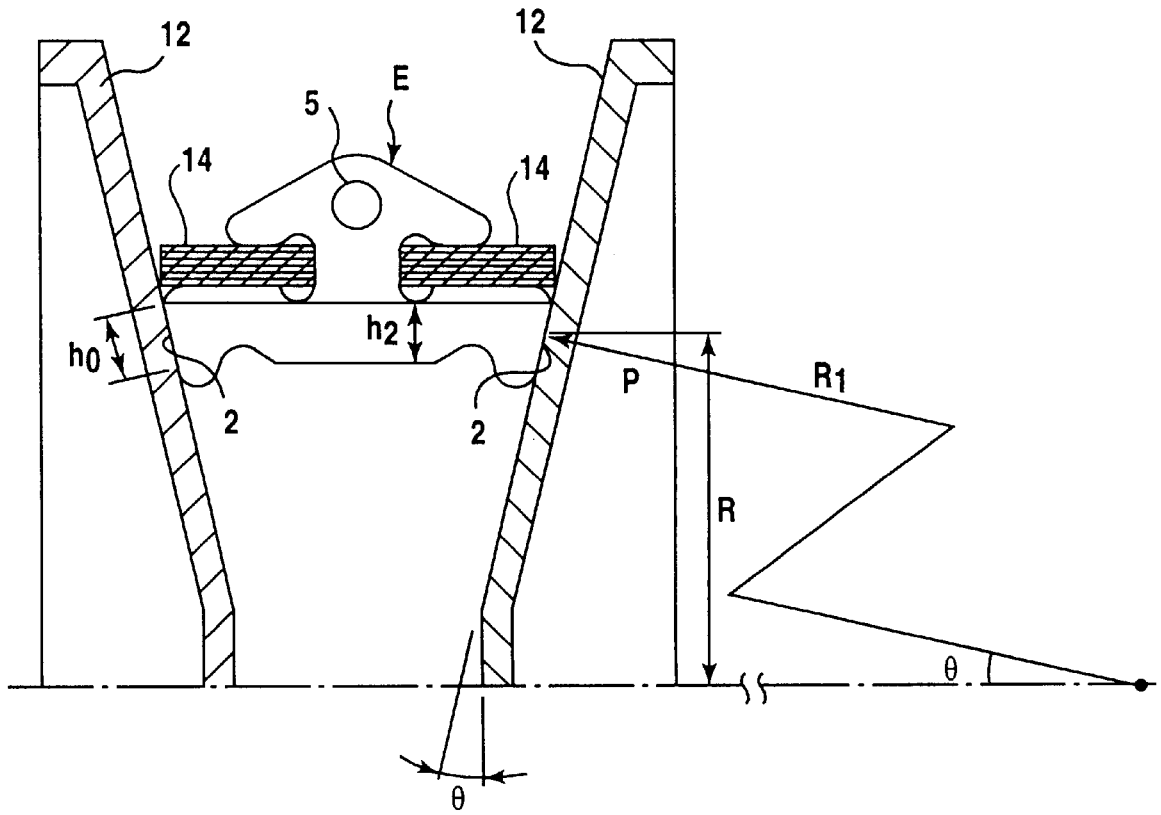
FIGS. 3a and 3b are schematic diagrams which are used for finding the Hertz's stress or σH acting on the element, FIG. 3a being a view showing a condition where the metal V-belt is disposed around a pulley, and FIG. 3b being an illustration of a local area where the V-shaped groove of the pulley and the V surface of the element come into contact with each other.
Figure 3B:
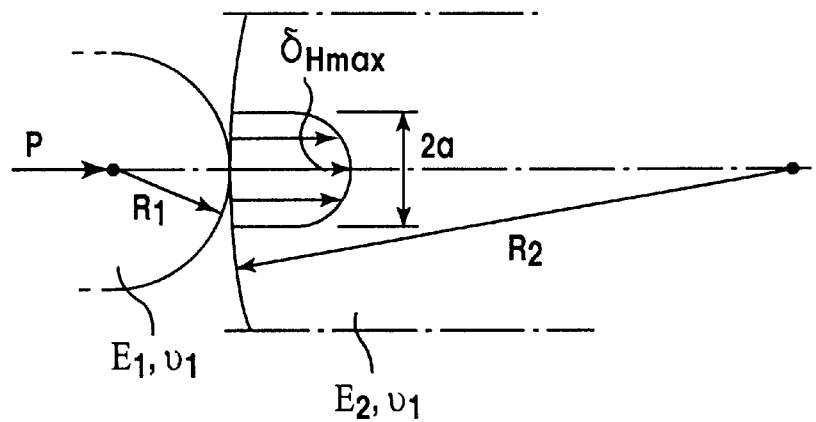

On the other hand, the V surface 2 of the element, which meets the V-shaped grooves of the pulleys, are exposed to the Hertz's stress $\sigma H$ which is caused from the normal forces acting on the surfaces of the V-shaped grooves. If two spherical surfaces having radii of curvature R1 and R2, respectively, are pushed by a normal force P to each other with a real contact length h0 as shown in FIG. 3, then the contact surface is formed as a band with a width 2a. Here, the maximum Hertz's stress $\sigma H$ can be described as the following equation, wherein E1 and E2 are the longitudinal moduli of the materials of the pulleys and the elements, respectively; v1 and v2 are the Poisson's ratios, respectively; $\theta$ is the angle of the V surface; R is the effective radius of torque transmission; and h0 is the real contact length between the pulley and the element.

$$R1 = R/\sin\theta \tag{3}$$

$$a = 2\sqrt{\{P\alpha/(\pi h0)[(1-v1^2)/E1 + (1-v2^2)/E2]/(1/R1 + 1/R2)\}} \tag{4}$$

$$\sigma H max = 2P\alpha/\pi ah0 \tag{5}$$

Figure 7:
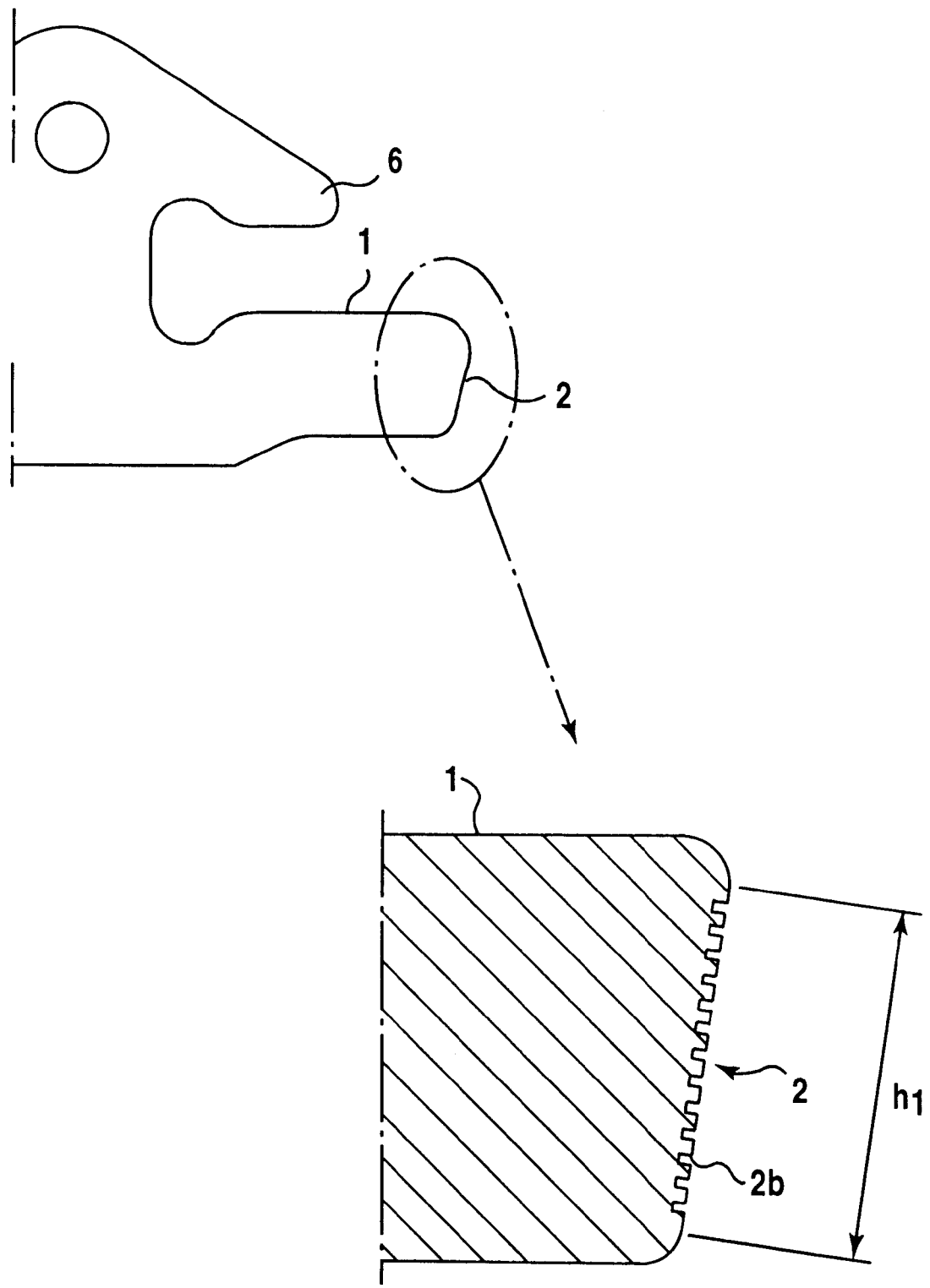
FIG. 7 is a partially enlarged view showing the surface condition of the V surface of the above mentioned element.

As shown in FIG. 7, which is an enlarged view of the V surface 2 of the element, a plurality of minute grooves 2b are provided in the V surface in the direction of the thickness of the element, the real contact length h0 in the above equation can be expressed with contact factors $\beta$ and $\gamma$ as "h0=$\beta\gamma$h1", wherein $\beta$ ("grooved elevation ratio" $\beta=\Sigma$ elevated lengths/h1) is the contact area ratio which geometrically removes the areas of the grooves 2b from the consideration; and $\gamma$ ("working face factor" $\gamma$=real contact length h1'/h1) is the dynamic contact ratio which includes the effect of motions during the operation.

Here, as R2=$\infty$, 1/R2=0. Then, v1=v2=v and E1=E2=E are applied to equation (4) to achieve the following equation.

$$a = \sqrt{[8P\alpha R1(1-v^2)/(\pi Eh0)]} \tag{6}$$

From equations (5) and (6), the following is achieved.

$$\sigma H max = \sqrt{\{P\alpha E/[2\pi h0 R1(1-v^2)]\}} \tag{7}$$

Then, from equations (3) and (7), the following is achieved.

$$\sigma Hmax = \sqrt{\{P\alpha E \cdot \sin\theta / [2\pi h0 R(1-v^2)]\}} \quad (8)$$

This equation (8) is rewritten for h0.

$$h0 = [P\alpha E \cdot \sin\theta] / [2\pi R(1-v^2) \cdot vHmax^2] \quad (9)$$

In the method for lightening the element according to the present invention, the relation between the heights h1 and h2 is determined to make the element acquire a substantially equal strength to withstand both the bending stress v2 produced in the body and the Hertz's stress vHmax produced in the V surface, both the stresses being represented in the above equations. For example, the relation between the heights h1 and h2 is determined such that the fatigue lives from these stresses are substantially equal to each other as shown in FIGS. 4(a) and (b).

Figure 4A:
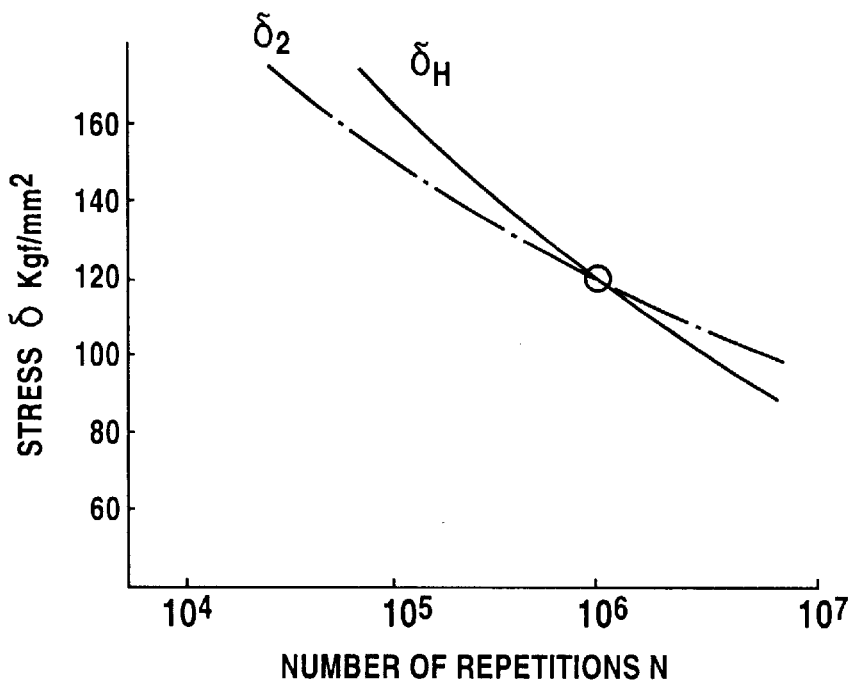
FIGS. 4a and 4b are schematic diagrams showing some examples of strength against fatigue (S-N characteristic) of the element, FIG. 4a showing an example in which the Hertz's stress σH and the bending stress σ2 come to be almost equal to each other at a predetermined number of repetitions, and FIG. 4b showing an example in which these stresses have different fatigue life characteristics.
Figure 4B:
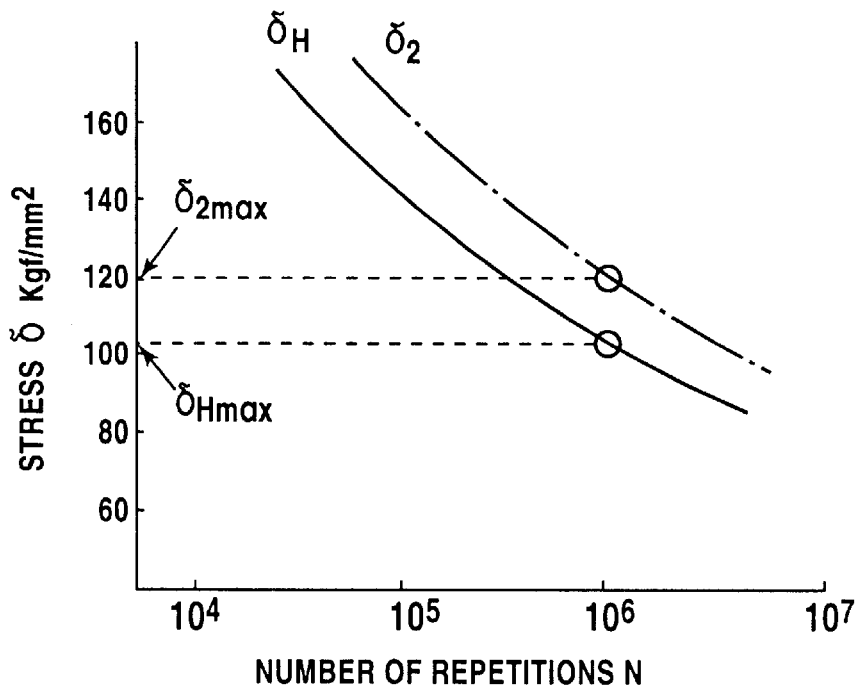

For example, the heights h1 and h2 are determined such that the fatigue strengths against these stresses are substantially equal to each other at a predetermined number of repetitions (e.g., $1 \times 10^6$) as shown in FIG. 4(a). If the characteristics of the element are determined to have different fatigue strengths as shown in FIG. 4(b), then the relation between the heights h1 and h2 should be determined such that these stresses v2 and vHmax can meet certain fatigue strengths at a predetermined number of repetitions, for example, $1 \times 10^6$. Now, as an example, the heights h1 and h2 are determined to make the bending stress v2 and the Hertz's stress vHmax substantially equal to each other.

First, the ratio of h2 and h0 is calculated from equations (2) and (9).

$$h2:h0 = \sqrt{[(6\mu L P\alpha)/(tv2)]} : [P\alpha E \cdot \sin\theta] / [2\pi R(1-v^2) \cdot vHmax^2] \quad (10)$$

Into this equation (10), v2=vHmax=120 kgf/mm² is applied. Furthermore, as the friction coefficient μ will not vary over the range of 0.15 to 0.6 of the contact area ratio (grooved elevation ratio) β of the V surface, for this range, specific values, i.e., P=63.8 kgf, α=3.3, L=9.5 mm, t=1.4 mm, μ=0.3, θ=11 degrees, R=27.8 mm, E=21000 kgf/mm², etc., are applied into the above equation to achieved the following.

$$h0 = 0.080 h2 \quad (11)$$

Figure 8:
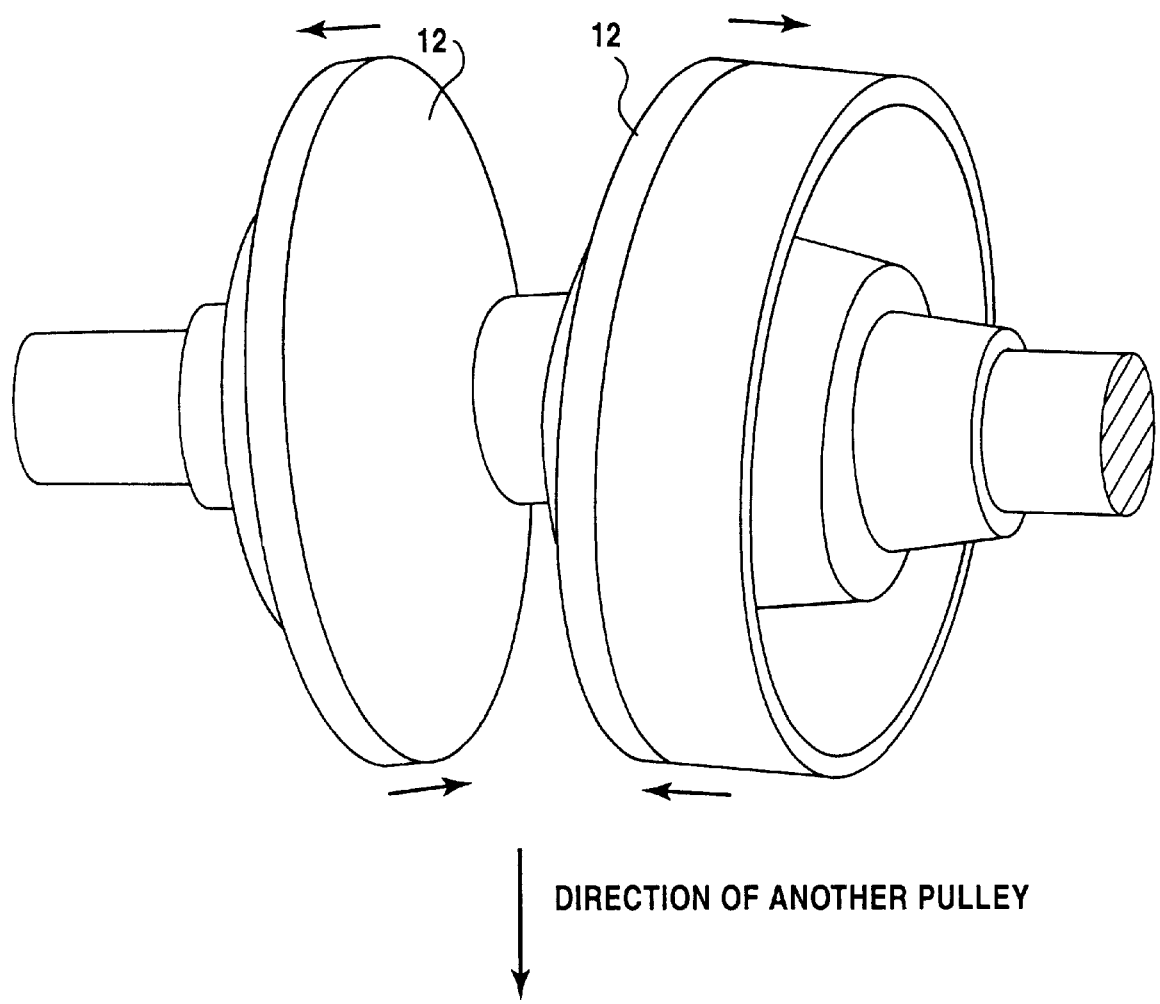
FIG. 8 is a schematic diagram describing the elastic deformation which is observed in a pulley of the continuously variable transmission while the transmission is in operation.

In the condition where the metal V-belt 13 is disposed around the driving pulley 11 and the driven pulley 12 and this belt drive is in operation, the reaction forces generated from the above mentioned stresses act on the V-shaped grooves of the pulleys, deforming them elastically. FIG. 8 shows schematically the simulated deformed condition of a pulley in such elastic deformation. In the pulley which is experiencing elastic deformation (e.g., the driven pulley 12 in FIG. 5), the region which is in contact with the elements can be categorized into the two sub-regions: one sub-region where the actual angle of the V-shaped groove is greater than the specified original angle of the pulley, i.e., 22 degrees, because the V-shaped groove has opened due to the elastic deformation, and the other where the actual angle of the V-shaped groove is smaller than the specified original angle, which is the reverse of the former.

Furthermore, in a continuously variable transmission which utilizes a metal V-belt, the control of the variable V-belt pitch radii around the pulleys, i.e., the control of the variable widths of the V-shaped grooves of the pulleys is carried out with pairs of fixed and movable pulley members. In each pulley, one sloped surface of the V-shaped groove is fixed on a shaft (as a fixed pulley member), and the other sloped surface of the V-shaped groove is mounted on the shaft axially slidable (as a movable pulley member). With this construction, the control is carried out by axially moving the respective movable pulley members through a hydraulic pressure control.

Figure 9A:
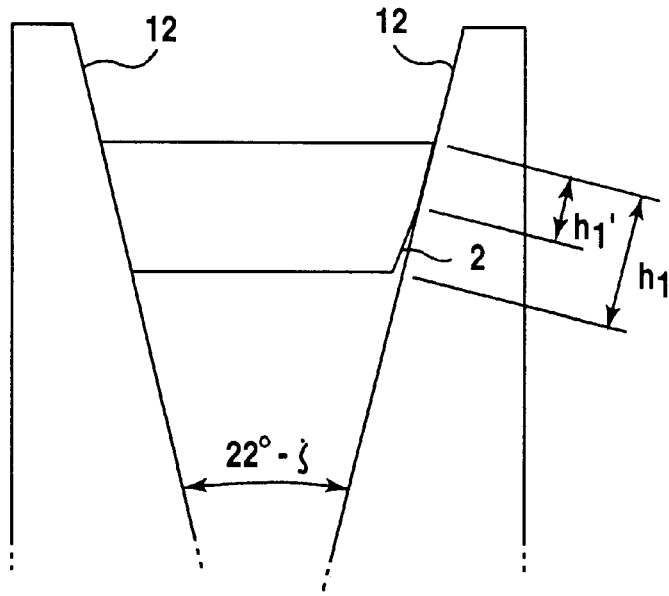
FIG. 9 is a schematic diagram showing the condition of the contact between the surfaces of the V-shaped groove of the pulley in elastic deformation and the corresponding V surface of the element.
Figure 9B:
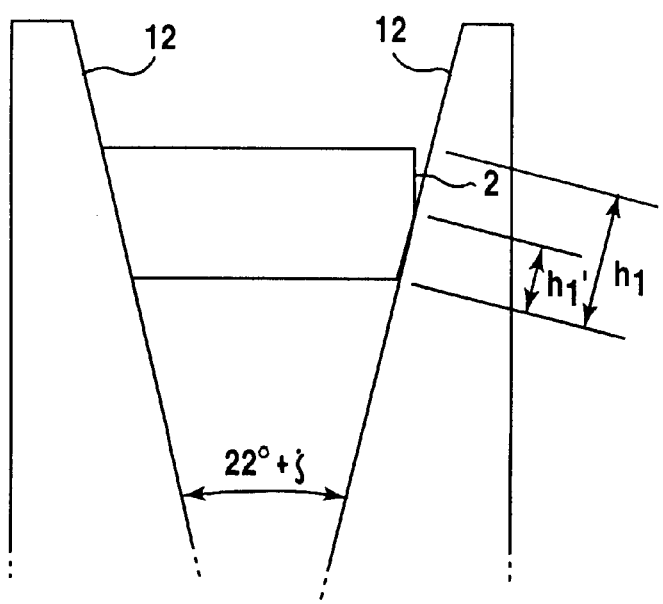

As a result, the condition of contact between the V surfaces 2 of the elements and the V-shaped grooves 12 of the pulley in the region where the angle of the V-shaped groove is greater than 22 degrees is different from the condition in the region where it is smaller than 22 degrees. The two lateral sides of the V surface of the element do not meet the V-shaped groove of the pulley uniformly, but one side of the V surface is in contact with a whole length h1 while the other side of the V surface is in contact with a real contact length h1'. This condition occurs in correspondence with the angular difference, which is caused by the elastic deformation, from the specific original angle of the V-shaped groove as shown in FIGS. 9(a) and (b).

Figure 10A:
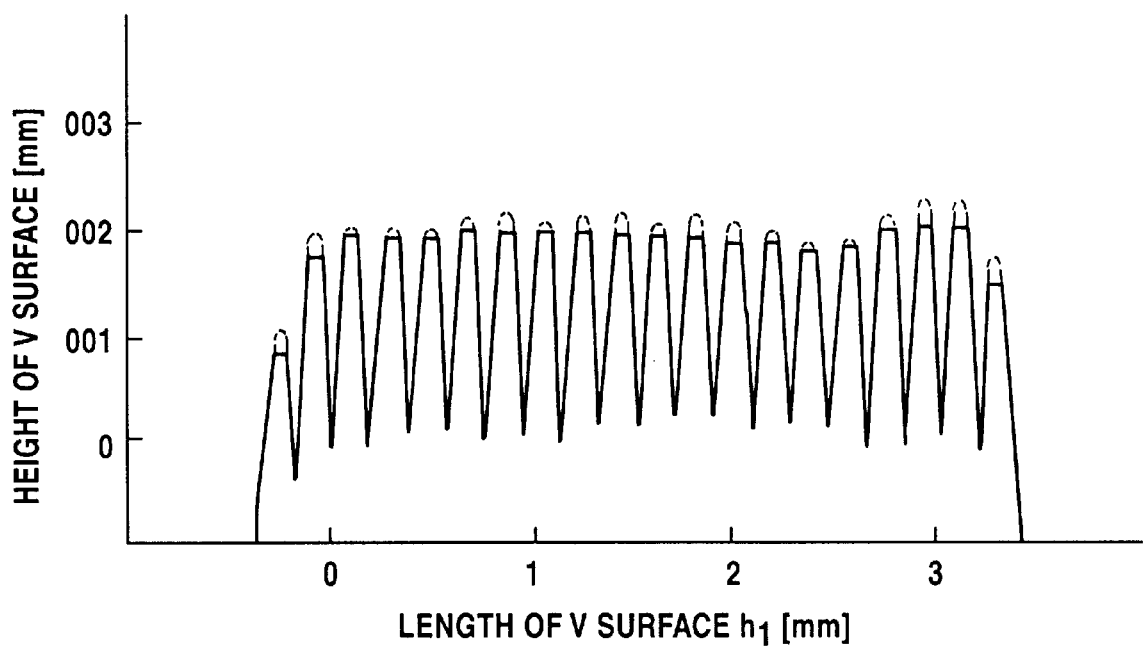
FIG. 10 are graphs showing the surface abrasion of the two surfaces of the V surface of the element, respectively, (a) and (b)

FIGS. 10(a) and (b) show the result of the measurement which is carried out on the two sides of the V surface of the element for analysis of the surface abrasion after an endurance test is executed on the metal V-belt under the maximum speed of a vehicle that uses the belt. Both graphs plot in magnification the length of the V surface to the axis of abscissa and the height of the V surface to the axis of ordinate, and the results of measurement before the endurance test and after are presented in two-dot chain line and in real line, respectively. The grooves seen in the graphs are the grooves 2b described in FIG. 7.

From these graphs, it is clear that the lateral two sides of the V surface of the element do not undergo uniform or equal abrasion, and that the one side of the V surface which experiences much abrasion is not worn out evenly at an angle throughout the whole surface but is worn out from both the upper and lower ends at different angles. This test result of the V surface abrasion is also a proof that the pulleys experience an elastic deformation as simulated in FIG. 8 and that, because of this elastic deformation, the condition of contact between the V surfaces 2 of the elements and the V-shaped grooves 12 of the pulleys is as illustrated in FIGS. 9(a) and (b) (one side of the V surface is in contact with the whole length h1 while the other is in contact with the real contact length h1', which is shorter than the whole length h1 correspondingly to the angular difference created by the elastic deformation).

Figure 10B:
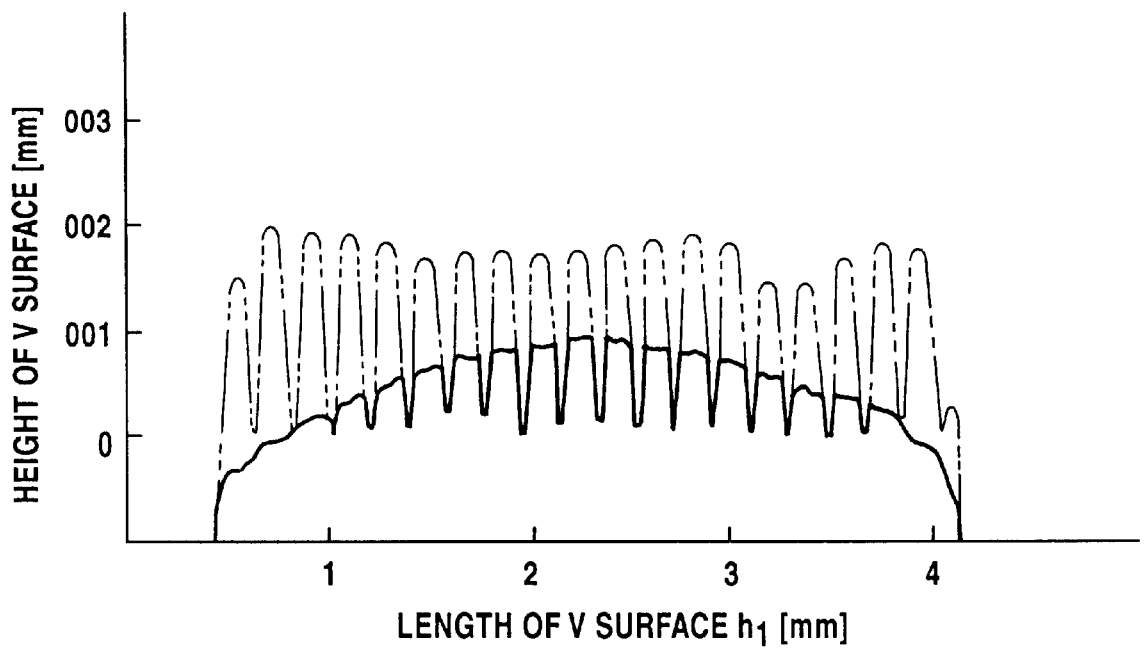

In consideration of the elastic deformation of the V surfaces of the elements which deformation appears when the metal V-belt is disposed around the pulleys, the ratio γ (working face factor γ=h1'/h1) of the real contact length h1' to the length h1 of the V surface is calculated from the graph in FIG. 10(b) to be about 0.5 (γ≈0.5). Therefore, when the maximum Hertz's pressure on the V surfaces of the elements is considered, it is preferable that calculations should be performed with the working face factor γ of about 50%.

Thus, substituting γ=0.5 in the above equation "h0=βγh1", and by substituting the result in equation (11), the following is achieved.

$$h1 = (0.160/\beta) h2 \quad (12)$$

When the grooved elevation ratio β is maximum (βmax= 0.6), the height h1 of the V surface becomes minimum h1 min.

$$h1\min = (0.160/0.6) h2 \approx 0.26 h2$$

When the grooved elevation ratio $\beta$ is minimum ($\beta$min=0.15), the height h1 becomes maximum h1 max.

$$h1\max=(0.160/0.15)h2\approx1.0h2$$

From these results, in this method, the height h1 of the V surface can be determined as 0.26 to 1.0 of the saddle primary thickness h2. Conventionally, this value has been h1=(1.25–2.0)h2. Therefore, according to the present invention, the length of the V surface of the element can be reduced in the metal V-belt.

Figure 11:
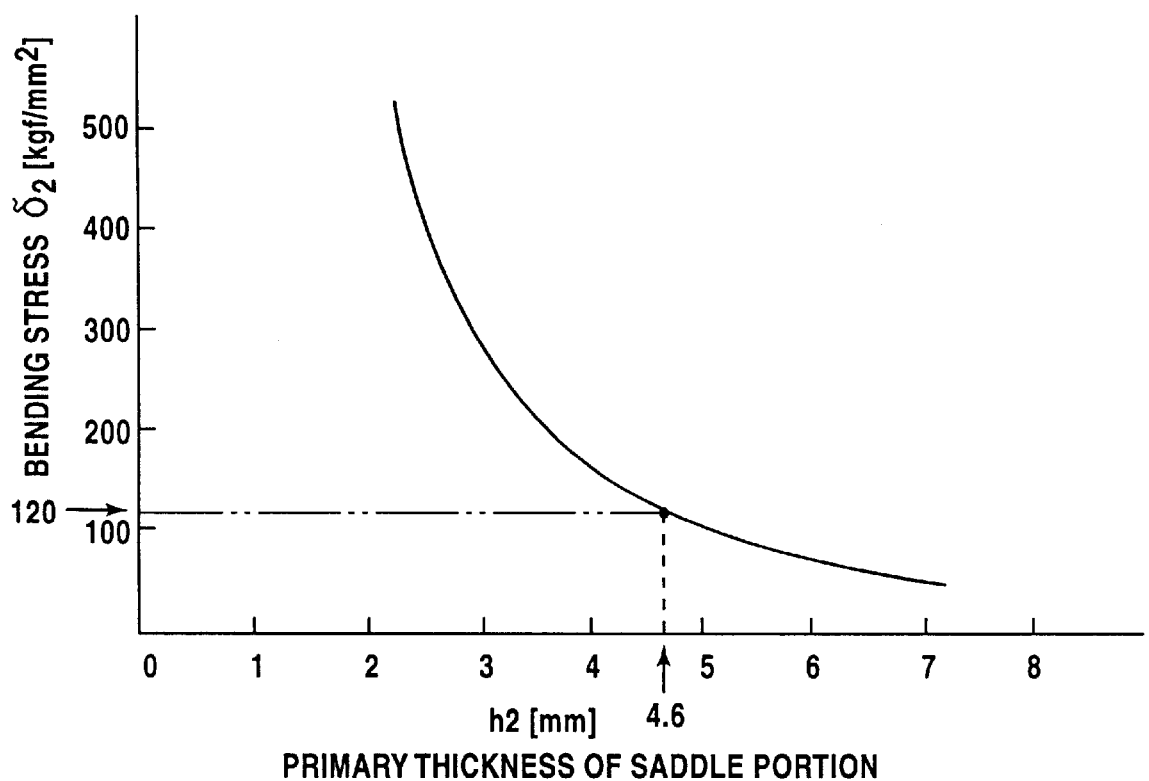
FIG. 11 is a graph showing a relation between the saddle primary thickness h2 of the element and the bending stress $\sigma 2$ being produced there.

As a reference, FIG. 11 presents the relation between the saddle primary thickness h2 of the element and the bending stress v2 being produced there. These plots are calculated from the above equation (2) with various values, which are mentioned above. From this graph in FIG. 11, it is understood that the saddle primary thickness h2 should be preferably more than 4.6 mm.

From this result, while the saddle primary thickness h2 is set at 4.6 mm with the working face factor $\gamma$ of 0.5, the grooved elevation ratio $\beta$ is varied from the minimum, i.e., $\beta$min=0.15, to the maximum, $\beta$max, to see the relation between the length h1 of the V surface and the Hertz's stress vH. The results are shown as a graph in FIG. 12. It is preferable that the length h1 of the V surface be in the range where the Hertz's stress is smaller than or equal to 120 kgf/mm$^2$ (vH$\leq$120 kgf/mm$^2$), i.e., in the range of $1.2\leq h1\leq 4.6$ mm ($0.26h2\leq h1\leq 1.0h2$) from the graph.

Figure 12:
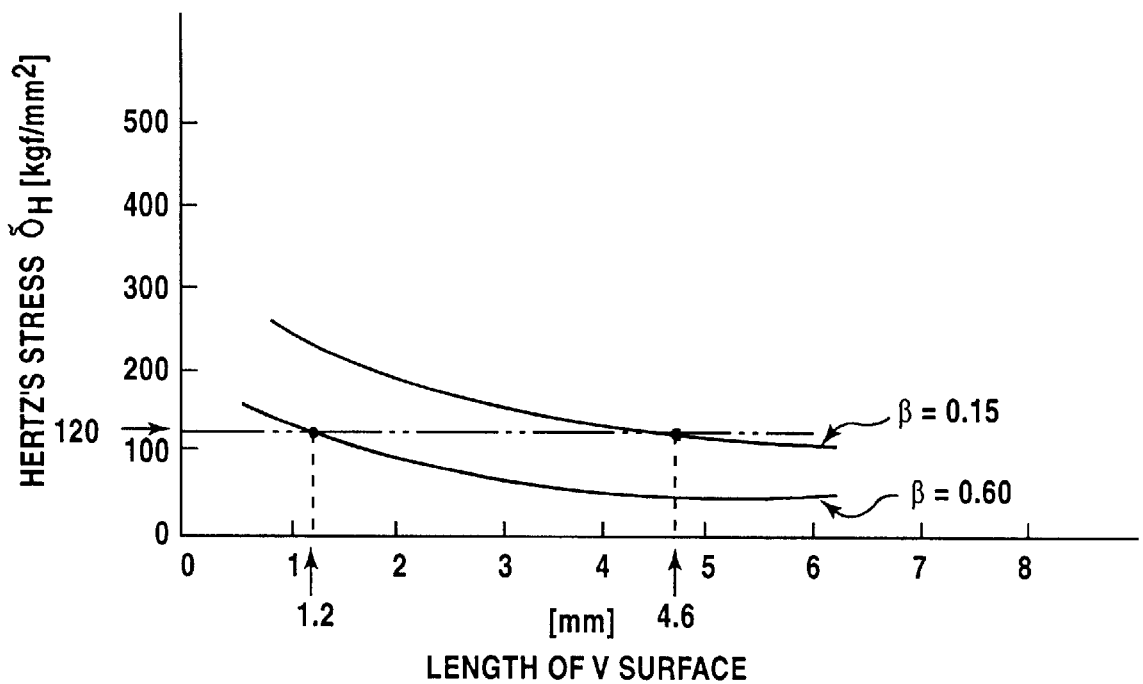
FIG. 12 is a graph showing a relation between the length h1 of the V surface and the Hertz's stress $\sigma H$ with the varying grooved elevation ratio $\beta$ of the V surface of the element.
Figure 13:
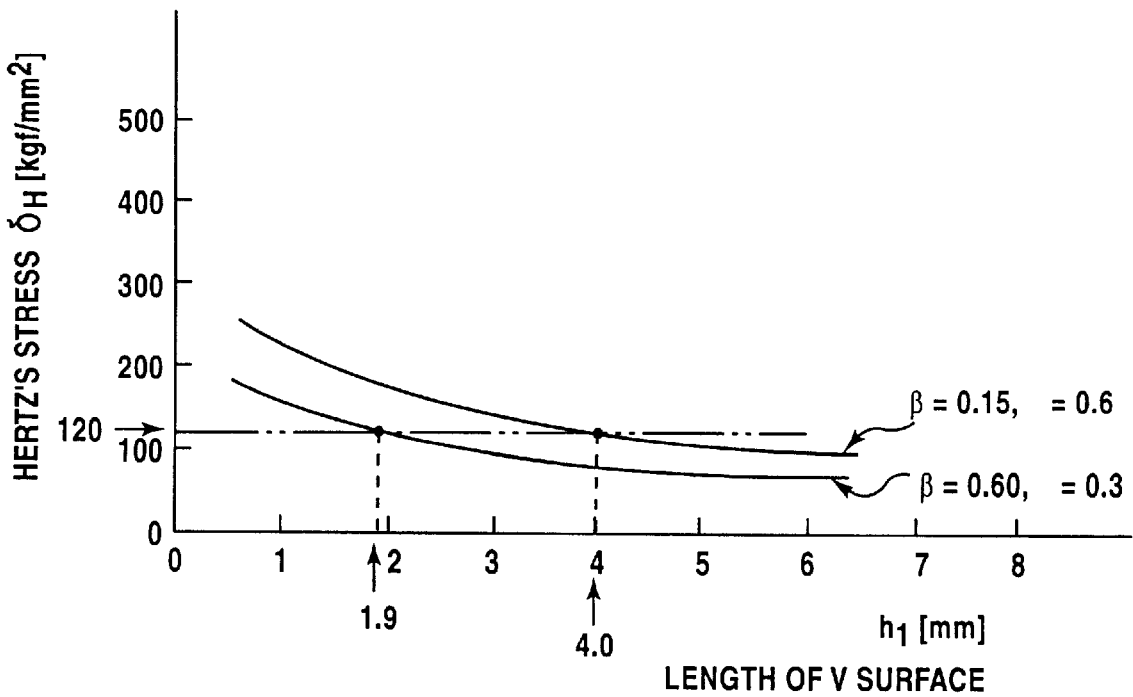
FIG. 13 is a graph showing a relation between the length h1 of the V surface and the Hertz's stress $\sigma H$ while the working face factor $\gamma$ is also varied in combination with the variation of the grooved elevation ratio $\beta$ of the V surface of the element.

More preferably, in consideration that, in reality, the amount of the elastic deformation of the grooves changes with the variation of the grooved elevation ratio $\beta$, and that the working face factor $\gamma$ changes in relation with the change of the amount of the elastic deformation, the graph in FIG. 12 is redrawn with $\gamma$=0.6 for $\beta$=0.15 and $\gamma$=0.3 for $\beta$=0.6 in FIG. 13. Preferably, the length h1 of the V surface is in the range of $1.90\leq h1\leq 4.00$ mm. Here, since the saddle primary thickness h2 is constant at 4.6 mm, h1 min=0.41h2 and h1 max=0.87h2. Therefore, the preferable range is $0.41h2\leq h1\leq 0.87h2$.

According to this present invention, the length h1 of the V surface is determined in relation with the saddle primary thickness h2 in the above mentioned way, and the lower portions of the saddles are cut off so that the center of gravity of the element can be located above the rocking edge (i.e., radially outside). The portions which are cut off in this way are shown in hatching in FIG. 1. Thus, the element E according to the present invention, which is configured by the above mentioned method, is smaller and lighter than the conventional element by the amount removed, which is shown in hatching and denoted by letter "D" in the figure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A metal V-belt comprising metal rings, each of which is an endless belt, and a plurality of metal elements, each of which is supported along said metal rings; said metal V-belt being disposed around a drive pulley and a driven pulley for power transmission;

wherein:
length h1 of V surface of each of said metal elements, which V surface comes into contact with V-shaped groove of each of said pulleys, and minimum height h2 of saddles in radial direction of each of said pulleys, which saddles are in contact with innermost portions of said metal rings, are determined;

such that strength for Hertz's pressure which acts on said V surface of said metal element and strength for bending moment which acts on said saddles of said metal element are made substantially equal to each other.

2. The metal V-belt as set forth in claim 1 wherein:
said length h1 of said V surface and said minimum height h2 of said saddles are determined such that Hertz's stress produced in said V surface of said metal element and bending stress produced at said minimum height portions of said saddles of said metal element are made substantially equal to each other.

3. The metal V-belt as set forth in claim 1 wherein:
said length h1 of said V surface and said minimum height h2 of said saddles are determined such that fatigue life by Hertz's pressure which acts on said V surface and fatigue life by bending moment which acts on said metal element are made substantially equal to each other.

4. The metal V-belt as set forth in any of claims 1 through 3 wherein:
said length h1 of said V surface is 0.26–1.0 of said minimum height h2 of said saddles.

5. The metal V-belt as set forth in any of claims 1 through 3 wherein:
center of gravity of said metal element is located radially outside of a line which is formed by a surface of said metal element intersecting with an inclined face, said inclined face being provided on said metal element for said metal V-belt to be freely flexible around said pulleys.

* * * * *